United States Patent
Long et al.

(10) Patent No.: US 10,913,813 B2
(45) Date of Patent: Feb. 9, 2021

(54) VINYLAMIDE BLOCK COPOLYMER KINETIC HYDRATE INHIBITOR AND PREPARATION METHOD AND USE THEREOF

(71) Applicant: GUANGZHOU INSTITUTE OF ENERGY CONVERSION, CHINESE ACADEMY OF SCIENCES, Guangzhou (CN)

(72) Inventors: Zhen Long, Guangzhou (CN); Qihang Ding, Guangzhou (CN); Deqing Liang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 159 days.

(21) Appl. No.: 16/311,703

(22) PCT Filed: May 31, 2018

(86) PCT No.: PCT/CN2018/089351
§ 371 (c)(1),
(2) Date: Dec. 20, 2018

(87) PCT Pub. No.: WO2019/128102
PCT Pub. Date: Jul. 4, 2019

(65) Prior Publication Data
US 2020/0239615 A1 Jul. 30, 2020

(30) Foreign Application Priority Data
Dec. 29, 2017 (CN) .......................... 2017 1 1476290

(51) Int. Cl.
*C09K 8/52* (2006.01)
*C08F 293/00* (2006.01)

(52) U.S. Cl.
CPC ............ *C08F 293/005* (2013.01); *C09K 8/52* (2013.01); *C08F 2438/01* (2013.01); *C09K 2208/22* (2013.01)

(58) Field of Classification Search
CPC .............. C08F 293/005; C08F 2438/01; C08F 2500/03; C08F 4/54; C09K 8/52; C09K 2208/22; C09K 8/035; C09K 8/524
See application file for complete search history.

(56) References Cited

U.S. PATENT DOCUMENTS

| | | | |
|---|---|---|---|
| 2007/0037938 A1* | 2/2007 | Harrison | C08F 4/50 526/72 |
| 2008/0312478 A1 | 12/2008 | Talley et al. | |
| 2010/0040572 A1 | 2/2010 | Mougin | |

FOREIGN PATENT DOCUMENTS

| | | | |
|---|---|---|---|
| CA | 2224947 | * | 7/1998 |
| CN | 102161720 | A | 8/2011 |
| CN | 102492407 | A | 6/2012 |
| CN | 104194756 | A | 12/2014 |
| CN | 104449600 | * | 3/2015 |
| CN | 104449600 | A | 3/2015 |
| CN | 104830291 | A | 8/2015 |
| CN | 105693926 | A | 6/2016 |
| CN | 106380541 | A | 2/2017 |
| CN | 108070063 | A | 5/2018 |
| WO | 2017147426 | A1 | 8/2017 |

OTHER PUBLICATIONS

Zhao, Kun et al. "Synthesis and Performance of New Hydrate Kinetic Inhibitors", Natural Gas Chemical Industry, vol. 38, No. (2), Apr. 20, 2013 (Apr. 20, 2013), pp. 51-55.

* cited by examiner

*Primary Examiner* — Kumar R Bhushan
(74) *Attorney, Agent, or Firm* — Bayramoglu Law Offices LLC

(57) ABSTRACT

A vinylamide block copolymer kinetic hydrate inhibitor and a preparation method thereof are disclosed. The vinylamide block copolymer kinetic hydrate inhibitor has a structural formula as shown in formula I. Through reverse atom transfer radical polymerization, under an anaerobic operating condition, with vinylcaprolactam and acrylamide as monomers, dimethylformamide as a solvent, azobisisobutyronitrile as an initiator, and a transition metal complex composed of a catalyst anhydrous copper chloride and a ligand 2,2'-bipyridine as a catalytic system, the method has achieved to catalyze a controllable free radical solution polymerization to obtain a poly(vinylcaprolactam-acrylamide) block copolymer kinetic hydrate inhibitor. The synthesized kinetic hydrate inhibitor has a controllable molecular weight, a narrow molecular weight distribution, and a controllable synthesis process, and exhibits an excellent inhibitory effect.

formula I

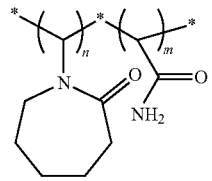

2 Claims, No Drawings

VINYLAMIDE BLOCK COPOLYMER KINETIC HYDRATE INHIBITOR AND PREPARATION METHOD AND USE THEREOF

CROSS REFERENCE TO THE RELATED APPLICATIONS

This application is the national phase entry of International Application No. PCT/CN2018/089351, filed on May 31, 2018, which is based upon and claims priority to Chinese Patent Application No. 201711476290.7, filed on Dec. 29, 2017, the entire contents of which are incorporated herein by reference.

TECHNICAL FIELD

The present invention relates to the technical field of hydrate inhibitors, and particularly to a vinylamide block copolymer kinetic hydrate inhibitor and preparation method and use thereof.

BACKGROUND

Natural gas hydrates are ice-like clathrate crystals formed by the combination of natural gas and water under certain conditions. During deep ocean drilling, natural gas hydrates are easily formed under a certain high pressure and a lower temperature. Thus, it is common for the gas hydrates to easily cause blockage of the pipeline and other facilities, affecting the normal exploitation and transportation of oil and natural gas, and in serious cases, resulting in a safety accident. At present, in addition to minimizing the drilling fluid column pressure, one of the most common and effective measures in the oil and gas industry is to inject a certain amount of gas hydrate inhibitor into the drilling fluid. Thermodynamic inhibitors are the most common inhibitors, but the required amount for injection is large and huge devices are required, resulting in high production costs and serious pollution.

In order to overcome the shortcomings of thermodynamic inhibitors, low dosage kinetic hydrate inhibitors have been proposed. Unlike thermodynamic inhibitors, kinetic inhibitors inhibit the formation of hydrate by reducing the nucleation rate of hydrates, delaying or even preventing the formation of critical nucleus, hindering the preferential growth orientations of hydrate crystals, and affecting the stability of hydrate crystal. It is confirmed in Chinese patents CN201110038875.7 and CN201410395938.8 that poly(N-vinylcaprolactam) and poly(N-vinylpyrrolidone) have an inhibitory effect on the formations of tetrahydrofuran hydrates and mixed-gas hydrates. In order to improve the inhibitory performance, researchers have successively developed copolymer kinetic hydrate inhibitors based on the existing high molecular weight homopolymer inhibitors. For example, Chinese patent CN201610802031.8 discloses a hydrate inhibitor consisting of an acrylamide (AM)/acrylonitrile (AN)/vinylcaprolactam (VCL) terpolymer which is synthesized in deionized water containing non-ionic surfactants. In Chinese patent CN201610094884.0, the inventors have found by evaluating with tetrahydrofuran that a branched polymer, which is prepared by copolymerization of vinylpyrrolidone, allyl polyoxyethylene polyoxypropylene epoxy ether, polyether amine and a solvent, has excellent inhibitory performance and is environment-friendly.

However, kinetic inhibitors will lose their effectiveness under high subcooling degree when used alone, and their inhibitory activity and biodegradability are still need to be improved, which largely limit their application. In addition to developing novel kinetic inhibitors with higher performance, combining the kinetic inhibitors with other thermodynamic inhibitors or synergists can also improves the inhibitory performance of kinetic inhibitors and thereby expand their application in deep water and ultra-deep ocean regions (Chinese patent CN201510219435.X). Moreover, most of the existing polymers are synthesized by free radical chain polymerization wherein the synthesized copolymers are random copolymers, resulting in a few shortcomings: the synthesis process is uncontrollable, molecular weight distributions of the products is wide, inhibitory effect is not good enough, which significantly limit their large-scale production and applications.

How to render a synthesis process controllable while keeping simple procedures, so as to control the molecular weight distribution of the product and improve the inhibitory performance of the inhibitor, is a problem need to be solved urgently.

SUMMARY

One object of the present invention is to provide a vinylamide block copolymer kinetic hydrate inhibitor and preparation method thereof. Through reverse atom transfer radical polymerization (RATRP), controllable synthesis is achieved such that the synthesized block copolymer has a controllable molecular weight and a narrow molecular weight distribution while the required amount for injection is small, is capable of working in a lower degree of subcooling, and exhibits an inhibitory effect better than normal random copolymers as a hydrate inhibitor.

The present invention is achieved by the following technical solution.

Provided is a vinylamide block copolymer kinetic hydrate inhibitor having a structural formula as shown in formula I and a weight average molecular weight of 10000-100000,

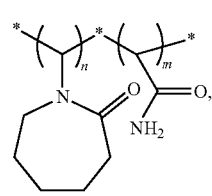

I wherein, n=90-1000, m=160-1000, and n and m are integers,
and a polydispersity index of the vinylamide block copolymer is 1.2 to 1.4.

Also provided is a preparation method of the vinylamide block copolymer kinetic hydrate inhibitor, having a synthetic route as follows:

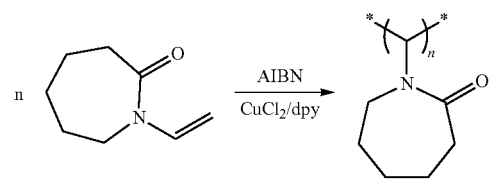

-continued

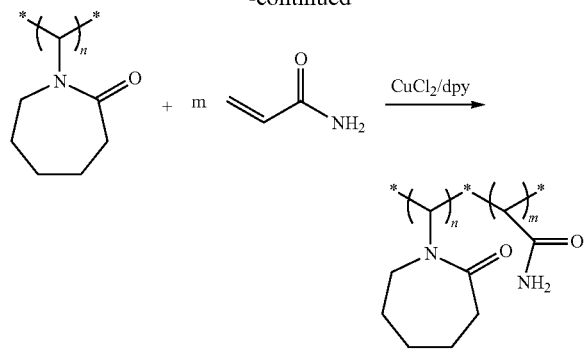

The method constructs a solid-liquid reaction system under an anaerobic operating condition, with vinylcaprolactam and acrylamide as monomers, dimethylformamide as a solvent, azobisisobutyronitrile as an initiator, and a transition metal complex composed of a catalyst anhydrous copper chloride and a ligand 2,2'-bipyridine as a catalytic system, to catalyze a controllable free radical solution polymerization to obtain a poly(vinylcaprolactam-acrylamide) block copolymer kinetic hydrate inhibitor, comprising the following steps:

(1) adding vinylcaprolactam, the catalyst anhydrous copper chloride and the ligand 2,2'-bipyridine into a reaction vessel, vacuumizing and introducing nitrogen to ensure the anaerobic operating condition.

(2) under the anaerobic operating condition, adding the initiator azobisisobutyronitrile and the solvent dimethylformamide to allow reaction at 70-85° C. for 40 hours, and then adding acrylamide under a protective nitrogen atmosphere to allow reaction for 40 hours; cooling the solution to room temperature, passing the solution through a neutral alumina column, drying by rotary evaporation at 80-95° C. and cooling to room temperature; adding dropwise the solution to a large amount of cold anhydrous diethyl ether, washing and drying the obtained solids to obtain a target product; a weight ratio of vinylcaprolactam to acrylamide is 2:1-1:3.

Preferably, a ratio of a total weight of vinylcaprolactam and acrylamide to a weight of the initiator is 50:1-200:1.

Preferably, a weight ratio between the catalyst anhydrous copper chloride, the ligand 2,2'-bipyridine and the initiator azobisisobutyronitrile is 2:2:1-4:10:1.

Preferably, a weight ratio of the initiator to the solvent is 1:100-1:500.

In step (2), the reaction temperature is preferably 80° C.

In step (2), the neutral alumina column has a length of 2-10 cm, and preferably 5 cm.

The present invention also protects the use of the vinylamide block copolymer kinetic hydrate inhibitor. It is used to inhibit hydrate formation in an oil-gas-water three-phase system, an oil-water two-phase system or a gas-water two phase system.

The inhibitor shall be first prepared as an aqueous solution when used. The aqueous solution of the vinylamide block copolymer kinetic hydrate inhibitor has a concentration of 0.5-2 wt %, a working pressure of 1-25 MPa and a working temperature ranging from −25° C. to 25° C.

The present invention has the following advantages.

1. Based on reverse atom transfer radical polymerization, the present invention constructs a solid-liquid reaction system under an anaerobic operating condition, with vinylcaprolactam and acrylamide as monomers, dimethylformamide as a solvent, azobisisobutyronitrile as an initiator, and a transition metal complex composed of a catalyst anhydrous copper chloride and a ligand 2,2'-bipyridine as a catalytic system in a certain ratio, to catalyze a controllable free radical solution polymerization to obtain a poly(vinylcaprolactam-acrylamide) block copolymer kinetic hydrate inhibitor. The preparation method has the characteristics of simple technique and controllable process.

2. The block copolymer kinetic hydrate inhibitor prepared by the present invention has an average weight average molecular weight of 10000-100000 and a polydispersity index of 1.2-1.4. The kinetic hydrate inhibitor synthesized by the present invention is a block copolymer; unlike normal random copolymers synthesized by free radical chain polymerization, as the structural units of the copolymer are not arranged randomly, the copolymer is made up of two linked blocks each block consisting of the same structural units. The synthesized kinetic hydrate inhibitor has a controllable molecular weight, a narrow molecular weight distribution, a controllable synthesis process, a small required amount for rejection and a good solubility, is capable of working in a lower subcooling degree, and exhibits an inhibitory effect better than normal random copolymers such as poly(vinylcaprolactam-vinylpyrrolidone), and thus can be used to inhibit hydrate formation in an oil-gas-water three-phase system, an oil-water two-phase system or a gas-water two phase system, and has excellent economic benefits and promising potentials in industrial applications.

DETAILED DESCRIPTION OF THE EMBODIMENTS

The following embodiments are explanation of the present invention but not limiting the invention.

The method for detecting and measuring the inhibitory effect of the products of the present invention is as follows.

The detecting equipment is a viewable high-pressure stirring experimental device. Its main components include a high-pressure reactor with two observation windows, a magnetic stirrer, a buffer tank, a cryostat, a manual booster pump, temperature and pressure sensors, a vacuum pump, a gas cylinder and a data acquisition device. The high-pressure reactor has a maximum working pressure of 30 MPa and a working temperature ranging from −30° C. to 100° C. The pressure in the high-pressure reaction kettle can be freely adjusted by the manual piston-type booster pump which has a highest pressure of 30 MPa. The cryostat is capable of providing a circulating refrigerant fluid of −30° C. to 100° C. to a jacket of the high-pressure reactor. The data acquisition device collects the pressure and temperature in the reaction kettle in real time. Hydrate formation can be determined by the change in temperature or pressure during reaction, or observed through the windows. After the reaction begins, a sudden drop in pressure in the reaction kettle is regarded as the beginning of the hydrate formation. A hydrate induction time is a period, which lasts from the time that the stirrer is turned on under stable initial pressure and temperature, till the time that the pressure begins to decrease sharply. The effect of the inhibitor is detected according to the hydrate induction time, that a longer time indicates a better inhibitory effect.

Detailed Detection Process:

The experimental temperature is 4° C., the experimental pressure is 8.0 MPa, and the experimental gas is methane. The equilibrium temperature for methane hydrate formation under 8.0 MPa is 11.45° C. Before the experiment run, the reactor is washed repeatedly with deionized water for 3-5 times, and then the reactor and the experimental pipeline system are purged with nitrogen to ensure that the system is dried. The reactor is vacuumized and then added with 8 mL of the inhibitor solution. 1 MPa methane gas is introduced and then the reactor is vacuumized; this step is repeated for 3 times to ensure that the air in the system is removed. The cryostat is switched on to cool the reactor until the temperature in the reactor reaches 4° C. When the temperature is stable, an intake valve is turned on to introduce pre-cooled methane gas from the buffer tank to reach a pressure of 8.0 MPa. After a while, when the temperature and pressure in the reactor reach a stable state, the magnetic stirrer is turned on at a rotation speed of 500 rpm. The pressure in the reactor will decrease slightly after the stirring begins, since methane is dissolved in water; the changes in pressure and temperature thereafter are observed to determine whether the hydrate is formed.

Embodiment 1

0.386 g of anhydrous copper chloride, 0.898 g of 2,2'-bipyridine and 20 g of vinylcaprolactam were added into a three-necked flask. The three necks of the flask were then connected with a thermometer, a condenser and a rubber plug with a hole. The upper end of the condenser was connected to the gas line. After vacuumizing, nitrogen was introduced to preliminarily remove the air in the pipelines. 0.236 g of azobisisobutyronitrile and 90 mL of dimethylformamide were provided. Azobisisobutyronitrile was dissolved in dimethylformamide, the solution was then injected with a syringe into the flask through the hole of the rubber plug, and the flask was sealed. A step of vacuumizing and introducing nitrogen was then repeated for three times to ensure an anaerobic operating condition. The condensate circulation was started, the magnetic stirrer was turned on with a rotation speed of 300 rpm, and an oil bath was turned on to raise the temperature to 80° C. After reaction for 40 hours, 10.214 g of acrylamide was added into the flask under a protective nitrogen atmosphere to allow reaction for another 40 hours. Then the oil bath and the stirrer were turned off, and the solution was allowed to cool to room temperature. Then the solution was passed through a neutral alumina column with a length of 10 cm, and then transferred to a round-bottom flask. The solution was subjected to rotary evaporation at 90° C. until it was almost dry, allowed to cool to room temperature, and dropwise added into a large amount of cold anhydrous diethyl ether to precipitate. The obtained solids were washed and then vacuum-dried at 80° C. for 24 hours, so as to obtain a poly(vinylcaprolactam-acrylamide) block copolymer inhibitor with a weight average molecular weight of 30000.

Detection and measurement: The above inhibitor was prepared as an aqueous solution with a concentration of 0.5 wt %, 1 wt % or 2 wt %. With an initial temperature of 4° C. and an initial pressure of 8.0 MPa, detection was performed with the natural gas hydrate inhibitory effect test equipment to measure the hydrate induction time of the inhibitor. See table 1 for the results.

Comparative Example 1

A magnetic stir bar was added into a 250 mL three-necked flask. Then 352 mg of azobisisobutyronitrile was added into the flask. The three necks were respectively mounted with a thermometer, a condenser and a gas pipe, wherein the condenser and the gas pipe were connected to vacuum lines. A nitrogen gas cylinder and a vacuum valve were switched on, and a step of vacuumizing and introducing nitrogen was repeated for three times to remove the air in the flask. Under a protective nitrogen atmosphere, 22 mL of vinylpyrrolidone and 100 mL of dimethylformamide were added to the flask and the step of vacuumizing and introducing nitrogen was repeated for three more times. The magnetic stirrer and the oil bath were turned on to allow reaction for 7 hours at presetting temperature and rotation speed. After reaction was complete, the obtained mixed solution was transferred to a round-bottom flask, and subjected to rotary evaporation at 90° C. until the solution became viscous. The solution was allowed to cool and then added dropwise and slowly into 250 mL of cold ethyl acetate so as to obtain white viscous solids. After filtered with a sintered-glass funnel, the solids were transferred together with the filer paper to a watch glass, and dried in a vacuum oven at 45° C. for 48 hours, and then the temperature was raised to 105° C. for 1 hour to remove water, so as to obtain polyvinylpyrrolidone (PVP) with a weight average molecular weight of 48000. It was then prepared as a 1 wt % aqueous solution. With an initial temperature of 4° C. and an initial pressure of 8.0 MPa, detection was performed with the natural gas hydrate inhibitory effect test equipment to measure the hydrate induction time of the inhibitor. See table 1 for the results.

Comparative Example 2

A magnetic stir bar was added into a 250 mL three-necked flask. Then 176 mg of azobisisobutyronitrile was added into the flask. The three necks were respectively mounted with a thermometer, a condenser and a gas pipe, wherein the condenser and the gas pipe were connected to vacuum lines. A nitrogen gas cylinder and a vacuum valve were switched on, and a step of vacuumizing and introducing nitrogen was repeated for three times to remove the air in the flask. Under a protective nitrogen atmosphere, 20 g of vinylcaprolactam and 100 mL of dimethylformamide were added to the flask and the step of vacuumizing and introducing nitrogen was repeated for three more times. The magnetic stirrer and the oil bath were turned on to allow reaction for 7 hours at presetting temperature and rotation speed. After reaction was complete, the obtained mixed solution was transferred to a round-bottom flask, and subjected to rotary evaporation at 90° C. until the solution became viscous. The solution was allowed to cool and then added dropwise and slowly into 250 mL of cold anhydrous diethyl ether so as to obtain white viscous solids. After filtered with a sintered-glass funnel, the solids were transferred together with the filer paper to a watch glass, and dried in a vacuum oven at 45° C. for 48 hours, and then the temperature was raised to 105° C. for 1 hour to remove water, so as to obtain polyvinylcaprolactam (PVCap) with a weight average molecular weight of 15000. It was then prepared as a 1 wt % aqueous solution. With an initial temperature of 4° C. and an initial pressure of 8.0 MPa, detection was performed with the natural gas hydrate inhibitory effect test equipment to measure the hydrate induction time of the inhibitor. See table 1 for the results.

Comparative Example 3

13.92 g of vinylcaprolactam and 11 mL of vinylpyrrolidone were added into a three-necked flask. The three necks of the flask were then respectively sealed with a thermometer, a condenser, and a rubber plug with a hole. The upper end of the condenser was connected to the gas line. After vacuumizing, nitrogen was introduced to preliminarily remove the oxygen. 0.164 g of azobisisobutyronitrile and 90 mL of dimethylformamide were provided. Azobisisobutyronitrile was dissolved in dimethylformamide, the solution was then injected with a syringe into the flask through the hole of the rubber plug, and the hole of the rubber plug was sealed. A step of vacuumizing and introducing nitrogen was then repeated for three times to remove oxygen. The condensate circulation was started, the magnetic stirrer was turned on with a rotation speed of 300 rpm, and an oil bath was turned on to raise the temperature to 80° C. After reaction for 8 hours, the oil bath and the stirrer were turned off. The solution was allowed to cool to room temperature, and then transferred to a round-bottom flask. The solution was subjected to rotary evaporation at 90° C. until it was almost dry, allowed to cool to room temperature, and dropwise added into a large amount of cold anhydrous diethyl ether to precipitate. The obtained solids were washed and then vacuum-dried at 80° C. for 24 hours, so as to obtain a poly(vinylcaprolactam-vinylpyrrolidone) copolymer inhibitor with a weight average molecular weight of 18000. With an initial temperature of 4° C. and an initial pressure of 8.0 MPa, detection was performed with the natural gas hydrate inhibitory effect test equipment to measure the hydrate induction time of the inhibitor. See table 1 for the results.

TABLE 1

|  | Embodiment 1 | | | Comparative example 1 | Comparative example 2 | Comparative example 3 |
| --- | --- | --- | --- | --- | --- | --- |
| Concentration | 0.5 wt % | 1 wt % | 2 wt % | 1 wt % | 1 wt % | 1 wt % |
| Induction time (h) | 24.8 | 34.5 | 38.7 | 8.6 | 30.2 | 33.5 |

Through the measurement, it was found that, with an initial pressure of 8.0 MPa, an temperature of 4° C., and a concentration of 1 wt %, the vinylamide block copolymer kinetic hydrate inhibitor prepared by the present invention had an induction time of 34.5 hours for methane hydrate formation, indicating that it had a much stronger inhibitory effect than 1 wt % PVP, and also better than 1 wt % PVCap and 1 wt % random biopolymer.

The examples are merely preferred examples of the invention and are not intended to limit the scope of the invention. It should be noted that a plurality of modifications and refinements may be made by those skilled in the art without departing from the principles of the invention, and such modifications and refinements are also considered to be within the scope of the invention.

What is claimed is:

1. A method of inhibiting a hydrate formation in an oil-gas-water three-phase system, an oil-water two-phase system or a gas-water two phase system, comprising a step of adding a vinylamide block copolymer kinetic hydrate inhibitor into the oil-gas-water three-phase system, the oil-water two-phase system or the gas-water two phase system;
   wherein the vinylamide block copolymer kinetic hydrate inhibitor is prepared by the following steps:
   (1) adding a first monomer, and a catalytic system into a reaction vessel, and forming an anaerobic operating condition, wherein the first monomer is a vinylcaprolactam, and the catalytic system is a transition metal complex composed of a catalyst anhydrous copper chloride and a ligand 2,2'-bipyridine; and the anaerobic operating condition is formed by vacuumizing and introducing nitrogen;
   (2) under the anaerobic operating condition, adding an initiator, and a solvent into the reaction vessel to perform a reaction at a temperature of 70-85° C. for 40 hours, and then adding a second monomer under a nitrogen atmosphere into the reaction vessel to continue the reaction for 40 hours to obtain a reaction mixture; cooling the reaction mixture to room temperature to obtain a cooled reaction mixture, passing the cooled reaction mixture through a neutral alumina column to obtain a crude product, drying the crude product by rotary evaporation at a temperature of 80-95° C. to obtain a first product, and cooling the first product to room temperature to obtain a cooled first product adding dropwise the cooled first product to a cold anhydrous diethyl ether to obtain solids, washing and drying the solids to obtain the vinylamide block copolymer kinetic hydrate inhibitor; wherein the initiator is azobisisobutyronitrile, the solvent is dimethylformamide, the second monomer is acrylamide, and a weight ratio of the vinylcaprolactam to the acrylamide is 2:1-1:3;
   wherein, a ratio of a total weight of the vinylcaprolactam and the acrylamide to a weight of the initiator is 50:1-200:1, a weight ratio of the catalyst anhydrous copper chloride to the ligand 2,2'-bipyridine and to the initiator is 2:2:1-4:10:1, a weight ratio of the initiator to the solvent is 1:100-1:500.

2. The method according to claim 1, wherein when the vinylamide block copolymer kinetic hydrate inhibitor is used, an aqueous solution of the vinylamide block copolymer kinetic hydrate inhibitor has a concentration of 0.5-2 wt %, a working pressure of 1-25 MPa, and a working temperature ranging from −25° C. to 25° C.

* * * * *